(12) United States Patent
Takada et al.

(10) Patent No.: US 6,210,836 B1
(45) Date of Patent: Apr. 3, 2001

(54) LITHIUM SECONDARY BATTERY

(75) Inventors: Kazunori Takada, Osaka; Kazuya Iwamoto, Sakai; Shigeo Kondo, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/288,318

(22) Filed: Apr. 8, 1999

(30) Foreign Application Priority Data

Apr. 14, 1998 (JP) .................................................. 10-102341

(51) Int. Cl.$^7$ .............................. H01M 4/52; H01M 4/38
(52) U.S. Cl. .................................. 429/231.95; 429/231.1; 429/231.3; 429/221; 429/223
(58) Field of Search ............... 429/231.95, 231.1–231.3, 429/221, 223

(56) References Cited

U.S. PATENT DOCUMENTS

| | | | |
|---|---|---|---|
| 3,898,096 | * | 8/1975 | Heredy et al. . |
| 3,925,098 | * | 12/1975 | Saunders et al. . |
| 3,947,291 | * | 3/1976 | Yao et al. . |
| 4,145,806 | * | 3/1979 | Lai . |
| 4,302,518 | | 11/1981 | Goodenough et al. . |
| 4,446,213 | * | 5/1984 | Steinleitner . |
| 4,983,476 | | 1/1991 | Slane et al. . |
| 5,154,990 | | 10/1992 | Plichta et al. . |
| 5,260,147 | | 11/1993 | Delmas et al. . |
| 5,919,587 | * | 7/1999 | Mukherjee et al. . |
| 5,958,281 | * | 9/1999 | Takada et al. . |
| 6,022,640 | * | 2/2000 | Takada et al. . |

OTHER PUBLICATIONS

Brec, et al., "Chemical and Electrochemical Study of the $Li_xFeS_2$ Cathodic System ($0<x\leq2$)," Mat. Res. Bull., vol. 15, pp. 619–625, 1980.

Murphy, et al., "Low Voltage Behavior of Lithium/Metal Dichalcogenide Topochemical Cells," Journal of the Electrochemcial Society: Electrochemical Science and Technology, vol. 126, pp. 349–351, Mar. 1979.

Preto, et al., "Reactions of $FeS_2$, $CoS_2$, and $NiS_2$ Electrodes in Molten LiCl–KCl Electrolytes," Journal Electrochemical Society: Electrochemical Science and Technology, vol. 130, pp. 264–273, Feb. 1983.

Takada K. et al: "Lithium iron sulfide as an electrode material in a solid state lithium battery" Solid State Ionics, vol. 117, No. 3–4, Feb. 2, 1999, pp. 273–276 XP004154434.

Takada K. et al: "Electrochemical behavior of $LixM0_2$ (M=Co, Ni) in all solid state cells using a glass electrolyte" Solid State Ionics, vol. 79, Jul. 1, 1995, pp. 284–287 XP004050356.

European Search Report dated Jul. 29, 1999.

\* cited by examiner

*Primary Examiner*—Clifford C. Shaw
*Assistant Examiner*—Jonathan Johnson
(74) *Attorney, Agent, or Firm*—Stevens, Davis, Miller & Mosher, LLP

(57) ABSTRACT

A lithium ion conductive inorganic solid electrolyte is used as an electrolyte in a lithium secondary battery which uses a transition metal chalcogenide or a lithium• transition metal chalcogenide as an active material for negative electrode. There is provided a lithium secondary battery improved in reversibility and in charge and discharge cycle characteristics as compared with lithium secondary batteries which use a liquid electrolyte or a molten salt electrolyte as the electrolyte.

16 Claims, 4 Drawing Sheets

LITHIUM SECONDARY BATTERY

BACKGROUND OF THE INVENTION

1. Field of the Invention

The present invention relates to a lithium secondary battery using a transition metal chalcogenide or a lithium• transition metal chalcogenide as an active material for negative electrode.

2. Description of Related Art

With recent development of portable equipment such as personal computers, portable telephones, etc., demand for batteries as electric sources thereof much increases. Particularly, lithium batteries are intensively investigated in various fields as batteries capable of providing high energy density because lithium has a small atomic weight and has a large ionization energy.

It is considered that when a compound containing a transition metal is used as an active material for negative electrode of lithium batteries, the compound is reduced to a metal, resulting in deterioration of reversibility.

This will be explained taking iron as a transition metal and iron disulfide as a compound.

The electrode reaction of iron disulfide has been studied in thermal batteries, and it is reported that the reaction is represented by the following formula 1 (T. Tomczuk, B. Tani, N. C. Otto, M. F. Roche, and D. R. Vissers, J. Electrochem., vol. 129, p. 925 (1982)).

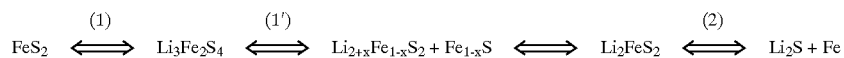

That is, the iron sulfide is reduced finally to metallic iron by the reduction reaction in the lithium batteries.

It is reported as to the electrode reaction of iron sulfide that a reaction reversible to some extent takes place at about 2V (R. Brec, A. Dugast, and A. le Mehaute, Mater. Res. Bull, vol. 15, p. 619 (1980) hereinafter referred to as "reference 1").

On the other hand, the potentials at which the reactions in the formula 1 take place are about 2.3 V for the reaction (1), about 2.0–1.5 V for the reaction (1'), and about 1.5 V for the reaction (2) as shown in FIG. 1 of reference 1.

In order to use iron sulfide as an active material for negative electrode of lithium batteries, it is necessary to use a reaction in the area showing a lower potential in the formula 1, the reaction (2). However, the metallic iron produced by reduction hardly reversibly returns to iron sulfide by subjecting it to oxidation, and the reversibility in the area of (2) is especially low. This decrease of reversibility is especially a serious problem when iron sulfide is used as an active material for negative electrode.

Production of metallic iron by the reduction reaction in case of using common liquid electrolytes or molten salt electrolytes is caused by a competitive reaction when a large current is passed, even if degree of the reduction is low. The production of metallic iron conspicuously occurs especially when degree of the reduction of iron sulfide is high, for example, when iron sulfide is further reduced from $Li_2FeS_2$ in the area of reaction (2) in the formula 1.

The above explanation is made of using iron as a transition metal element, but a reaction of the following formula 2 also takes place using cobalt or nickel as a transition metal element (S. K. Preto, Z. Tomczuk, S. von. Winbush, and M. F. Roche, J. Electrochem. Soc., vol. 130, p. 264 (1983)). In both the cases, the compounds are reduced to metal, and hence do not show excellent performance as an active material for negative electrode of secondary batteries.

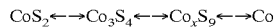

   2

When the transition metal element is titanium, a reaction of the following formula 3 takes place (D. W. Murphy and J. N. Carodes, J. Electrochem. Soc., vol. 126, 349 (1979) hereinafter referred to as "reference 2"). It is reported that the reversibility of this reaction is improved by carrying out the reaction only in the area of lower potential. However, as can be seen from FIG. 4 of the reference, the reversibility is insufficient for practical secondary batteries.

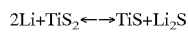   3

Furthermore, reference 2 discloses that a battery of $Li_2TiS_2/Li^+/TiS_2$ type which uses a lithium-containing transition metal sulfide as an active material for negative electrode can be a battery having an operating voltage of 1.5–1.9 V. However, as shown in FIG. 4, since the reversibility of $Li_2TiS_2$ as an active material for negative electrode is poor, the reversibility must be further improved for obtaining practical batteries.

Reference 2 also makes mention of the reversibility of $LiCrS_2$. However, it is disclosed that this electrode can reversibly act in the area of the potential being about 2 V and Li/Cr being 0.3, and the reaction in the lower potential area (0.7 V) which is preferred as an active material for negative electrode is irreversible. As for $VS_2$, it is concluded there that reversibility of the electrode reaction is also poor as shown in FIG. 2, and reversibility of $VSe_2$ is excellent, but the reaction area is of less than 1.3 atom for vanadium.

In the above, the problems to be solved by the present invention have been explained using sulfides as chalcogenides, but selenides also suffer from the same problems, and the reaction in the lower potential area (0.25 V) as seen for $NbSe_2$ is also irreversible as shown in reference 2.

BRIEF SUMMARY OF THE INVENTION

The object of the present invention is to solve the above problems, namely, to provide a rechargeable lithium secondary battery using a transition metal chalcogenide or a lithium• transition metal chalcogenide as an active material for negative electrode.

Other objects of the present invention will be readily apparent from the following description of the invention.

The inventors have found that when a lithium ion conductive solid electrolyte is used for the electrode reaction of transition metal chalcogenides or lithium• transition metal chalcogenides, the reaction of the transition metal being reduced to metal does not take place, and the electrode reaction takes place reversibly. Based on this finding, according to the present invention, a rechargeable lithium secondary battery which uses a transition metal chalcogenide or a lithium• transition metal chalcogenide as an active material for negative electrode can be constructed, for the first time, by using a lithium ion conductive inorganic solid electrolyte as an electrolyte.

That is, according to the present invention, an electrolyte mainly comprising a lithium ion conductive inorganic solid electrolyte is used in a lithium secondary battery in which a transition metal chalcogenide or a lithium• transition metal chalcogenide as an active material for negative electrode. For obtaining batteries of high energy density, lithium• transition metal chalcogenides are preferred.

The transition metal is preferably at least one transition metal element selected from iron, cobalt and nickel, and iron is especially preferred.

Furthermore, it is preferred to make the lithium secondary battery so that when the lithium• transition metal chalcogenide is represented by $Li_xMeX_y$ (Li: lithium, Me: at least one selected from iron, cobalt and nickel, X: chalcogen, and x and y are numerals corresponding to the compositional ratio of the elements), the minimum formal charge (n) of the transition metal element during the operation of the total solid lithium secondary battery satisfies $+2 \geq n \geq 0$, with a proviso that the formal charge of chalcogen is $-2$ and the formal charge of lithium is $+1$.

Moreover, the transition metal element may be at least one transition metal element selected from vanadium, titanium, chromium, molybdenum, niobium, and manganese.

In this case, it is preferred to make the lithium secondary battery so that when the lithium• transition metal chalcogenide is represented by $Li_xMeX_y$ (Li: lithium, Me: at least one selected from vanadium, titanium, chromium, molybdenum, niobium, and manganese, X: chalcogen, and x and y are numerals corresponding to the compositional ratio of the elements), the minimum formal charge (n) of the transition metal element during the operation of the totally-solid lithium secondary battery satisfies $+3 \geq n \geq 0$, with a proviso that the formal charge of the chalcogen is $-2$ and the formal charge of lithium is $+1$.

Moreover, sulfur is preferred as the chalcogen element.

The lithium ion conductive inorganic solid electrolyte is preferably a sulfide-based lithium ion conductive solid electrolyte mainly composed of sulfide, and more preferably a sulfide-based lithium ion conductive solid electrolyte containing a bridging oxygen.

Furthermore, a lithium-containing transition metal oxide is preferred as an active material for positive electrode.

The present invention may also be a sub-combination of these described features.

DETAILED DESCRIPTION OF THE INVENTION

Figure 1:
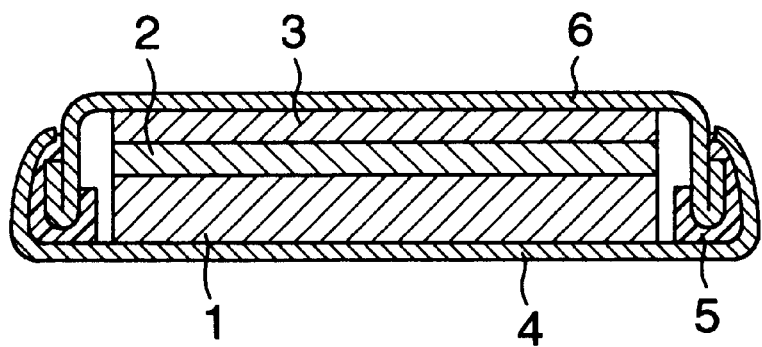
FIG. 1 is a sectional view of the lithium secondary battery in one example of the present invention.

The present invention will be explained below. For simplification of the explanation, iron is taken as the transition metal element and sulfur is taken as the chalcogen, namely, iron sulfide is taken as an example of the transition metal chalcogenide.

In the present invention, iron sulfide is used as an active material for negative electrode. Therefore, it is preferred that iron sulfide shows lower potential, and, accordingly, is of the reaction area indicated by (2) in the formula 1. Therefore, the transition metal chalcogenide is preferably a lithium transition metal chalcogenide containing lithium.

The following formula 4 shows the formal charge of iron when the formal charge of lithium is $+1$ and the formal charge of sulfur is $-2$ in a part of the reaction shown in the formula 1. As is clear from the formula 4, where production of the metallic iron conspicuously occurs is when the formal charge of iron is smaller than $+2$.

$$Fe^{4+}S_2 \leftarrow \rightarrow Li_3Fe^{2.5+}{}_2S_4 \leftarrow \rightarrow Li_2Fe^{2+}S_2 \leftarrow \rightarrow Li_2S+Fe^0 \qquad 4$$

Therefore, the effect of the present invention using a lithium ion conductive inorganic solid electrolyte as an electrolyte is especially great when the lithium iron sulfide is deeply reduced until the minimum formal charge (n) of iron during the operation of the lithium secondary battery satisfies $+2 \geq n \geq 0$ in case the lithium iron sulfide is represented by $Li_xFeS_y$ (Li: lithium, Fe: iron, S: sulfur, and x and y are numerals corresponding to the compositional ratio of the elements) and the formal charge of sulfur is $-2$ and the formal charge of lithium is $+1$.

However, the expression $Li_xFeS_y$ in this specification is used for convenience sake. This includes not only the compounds of single phase, but also those having a plurality of crystal phases, a plurality of amorphous phases or a mixture of crystal phase and amorphous phase which has an elemental composition of $Li_xFeS_y$ in average value of the mixed state. That is, the expression $Li_2Fe_2S_4$ is also used for the mixture of $FeS_2$ and $Li_2FeS_2$ at a molar ratio of 1:3.

Transition metal elements which show the same electrode reaction as iron sulfide include cobalt, nickel, etc. in addition to iron. The present invention have the similar effect on sulfides, tellurides and selenides of these elements. Therefore, the effect of the present invention is especially great in case that when the lithium• transition metal chalcogenide is represented by $Li_xMeX_y$ (Li: lithium, Me: at least one selected from iron, cobalt and nickel, X: chalcogen, and x and y are numerals corresponding to the compositional ratio of the elements), the minimum formal charge (n) of the transition metal element during the operation of total solid lithium secondary battery satisfies $+2 \geq n \geq 0$, with a proviso that the formal charge of chalcogen is 2 and the formal charge of lithium is $+1$.

The transition metal chalcogenides of iron, cobalt, nickel, etc. have plateaus of potentials of two stages corresponding to the two stage reactions formally represented by the following formulas 5 and 6 in case of the transition metal being denoted by Me. Therefore, when both of the two stage reactions are used as electrode reactions, it shows a high capacity density corresponding to 4 electrons. Even when only the reaction of the formula 6 is used to increase the operating voltage of the battery, it shows a high capacity density corresponding to 2 electrons. Therefore, the transition metal is preferably at least one transition metal element selected from iron, cobalt and nickel.

$$Me^{4+}X_2 \leftarrow \rightarrow Li_2Me^{2+}X_2 \qquad 5$$

$$Li_2Me^{2+}X_2 \leftarrow \rightarrow Li_4Me^0X_2 \qquad 6$$

Of these transition metal elements, iron is most preferred because iron is cheap and is rich in resources.

In comparison with iron, cobalt and nickel, the electrode reactions of chalcogenides of vanadium, titanium, chromium, molybdenum, niobium and manganese show plateaus of potentials of two stages corresponding to the two stage reactions formally represented by the formulas 7 and 8 in the case of the transition metal being denoted by Me. Therefore, when both the two stage reactions are used as the electrode reactions, a capacity corresponding to 2 electrons is obtained, and when only the reaction of the formula 6 is used to increase the operating voltage, the capacity corresponding to 1 electron is obtained. Depending on the capacity and operating voltage desired for battery, chalcogenides of these transition metals or lithium• transition metal chalcogenides of these transition metals may be used.

$$Me^{4+}X_2 \leftarrow \rightarrow Li_2Me^{3+}X_2 \qquad 7$$

$$LiMe^{3+}X_2 \leftarrow \rightarrow Li_2Me^{2+}X_2 \qquad 8$$

As is clear from the formulas 7 and 8, as for the formal charge of the transition metal elements in electrode reaction when these transition metal elements are used, the formal charge (n) of the transition metal elements during the operation of the totally-solid lithium secondary battery is between +4 and +2 when the lithium• transition metal chalcogenide is represented by $Li_xFeS_y$ (Li: lithium, Me: at least one selected from the group consisting of vanadium, titanium, chromium, molybdenum, niobium and manganese, X: chalcogen, and x and y are numerals corresponding to the compositional ratio of the elements), and when the formal charge of chalcogen is −2 and the formal charge of lithium is +1. For most of the lithium• transition metal chalcogenides containing these transition metal elements, the reaction reversibly proceeds within the range of $+4 \geq n \geq +3$ shown by the formula 7 even when a liquid electrolyte is used, but the potential is higher as compared with the range of $n \leq +3$. By using a lithium ion conductive inorganic solid electrolyte as an electrolyte according to the present invention, the reaction shows a high reversibility even in the range of $n \leq +3$ in which the potential is lower. Therefore, the effect of the present invention is especially great in case of the minimum value of n being $+3 \geq n \geq 0$, and a lithium secondary battery of high operating voltage can be obtained. For obtaining batteries of further higher energy density, the range of $+2.5 \geq n$ is especially preferred.

As the chalcogen of the transition metal chalcogenides or lithium• transition metal chalcogenides in the present invention, sulfur is especially preferred because sulfur is lower than selenium or tellurium in toxicity and furthermore weight per equivalent amount can be reduced.

As the lithium ion conductive inorganic solid electrolytes, those mainly composed of sulfide are preferred for the following reasons.

The first reason is that when a sulfide-based solid electrolyte and an oxide-based solid electrolyte are compared, the former shows higher ionic conductivity since sulfur is an element higher than oxygen in polarizability, and, hence, output of the battery can be made greater and charging rate can also be improved.

The second reason is that since the active material for negative electrode used is a sulfide, chemical stability against the active material for negative electrode is improved.

Further, the sulfide-based lithium ion conductive solid electrolytes are preferably those which have a bridging oxygen. Inorganic solid electrolytes generally comprise fixed anionic secondary lattice and mobile ion. The anionic secondary lattice is constituted by a covalent bond, and presence of oxygen at bridged site results in strong covalent bond and the structure of the solid electrolytes can be stabilized. On the other hand, when the unbridged site is occupied by sulfur, electrostatic attraction force between the unbridged site and the lithium ion can be reduced as compared with when the unbridged site is occupied by oxygen, and thus lithium ion can be made easy to move. As a result, ionic conductivity of the solid electrolyte is improved, and the battery characteristics can be improved.

As the active material for positive electrode of the lithium secondary battery of the present invention, most preferred is a lithium-containing transition metal oxide.

The negative electrode reaction when iron sulfide ($FeS_2$) is used as the active material for negative electrode is formally shown in the formula 9. In the formula 9, the reaction progressing in the right direction corresponds to the charging reaction of battery and the reaction progressing in the left direction corresponds to the discharging reaction. $FeS_2$ and $Li_2FeS_2$ can be chemically synthesized, and batteries can be made using these compounds. On the other hand, the compound formally represented by the composition of $Li_4FeS_2$ in the formula 9 has not been found so far, and process for the synthesis of it is not known. Therefore, in making batteries, $FeS_2$ or $Li_2FeS_2$ must be used as the active material for negative electrode, and thus the negative electrode of the battery is constructed in discharged state. Therefore, it is preferred that the active material for positive electrode in discharged state is used with the above active material for negative electrode.

When transition metal element oxide is represented by $MeO_y$, the electrode reaction of the transition metal oxide is generally shown by the formula 10. In the formula 10, the reaction progressing in the right direction is the discharging reaction, and the reaction progressing in the left direction is the charging reaction. Accordingly, in order to satisfy the above conditions, it is preferred to use a lithium-containing transition metal oxide as the active material for positive electrode.

Similarly, lithium-containing transition metal sulfides such as $Li_xTiS_2$ and $Li_xNbS_2$ can also be used. However, since the lithium-containing transition metal oxides generally show the higher potential, battery voltage can be increased by using the lithium-containing transition metal oxides, and thus lithium secondary batteries of high energy density can be obtained.

The transition metals used for these lithium-transition metal oxides are preferably at least one selected from the group consisting of cobalt, nickel, manganese, iron and vanadium.

$$FeS_2 \leftarrow \rightarrow Li_2FeS_2 \leftarrow \rightarrow Li_4FeS_2 \qquad 9$$

$$MeO_y \leftarrow \rightarrow Li_xMeO_y \qquad 10$$

Having thus generally described the present invention, the following specific examples are provided to illustrate the invention. The examples are not intended to limit the scope of the invention.

EXAMPLES

The present invention will be explained in detail by the following examples.

Example 1

In this example, iron disulfide ($FeS_2$) was used as the transition metal chalcogenide as the active material for negative electrode, lithium cobalt oxide ($LiCoO_2$) was used as the active material for positive electrode, and a sulfide-based lithium ion conductive solid electrolyte was used as the lithium ion conductive inorganic solid electrolyte. In more detail, an amorphous solid electrolyte represented by $0.01Li_3PO_4$-$0.63Li_2S$-$0.36SiS_2$ was used as the sulfide-based lithium ion conductive solid electrolyte. A lithium secondary battery was made in the following manner, and the characteristics thereof were evaluated.

First, the sulfide-based lithium ion conductive solid electrolyte was prepared in the following manner.

Lithium phosphate ($Li_3PO_4$), lithium sulfide ($Li_2S$) and silicon sulfide ($SiS_2$) as starting materials were mixed at a molar ratio of 1:63:36, and the mixture of the starting materials was charged in a crucible of glassy carbon. This crucible was put in a vertical furnace and heated to 950° C. in an argon stream to make the mixture into molten state. After heating for 2 hours, the melt was dropped onto twin rollers and rapidly cooled to obtain a lithium ion conductive solid electrolyte represented by $0.01Li_3PO_4$-$0.63Li_2S$-$0.36SiS_2$. This solid electrolyte was ground to obtain a powder.

$LiCoO_2$ as the active material for positive electrode was prepared by weighing cobalt oxide ($Co_3O_4$) and lithium carbonate ($Li_2CO_3$) so as to give a ratio of Co/Li=1, mixing them, and firing the mixture at 900° C. in the air. The resulting $LiCoO_2$ and the solid electrolyte powder were mixed at a weight ratio of 3:2 to obtain a material for positive electrode.

$FeS_2$ used as the active material for negative electrode was a commercially available reagent. This $FeS_2$ and the solid electrolyte powder were mixed at a weight ratio of 1:1 to obtain a material for negative electrode.

FIG. 1 is a sectional view of the lithium secondary battery A in this example. In FIG. 1, 1 indicates a positive electrode, which comprised 105 mg of the material for positive electrode obtained above, and 2 indicates a lithium ion conductive solid electrolyte layer. These were press molded together with negative electrode 3 comprising 10 mg of the material for negative electrode obtained above to make an integral three-layer structure. This integrally molded pellet was put in a battery case 4 made of stainless steel and the case was sealed with a stainless steel lid 6 by means of an insulating gasket 5.

Figure 2:
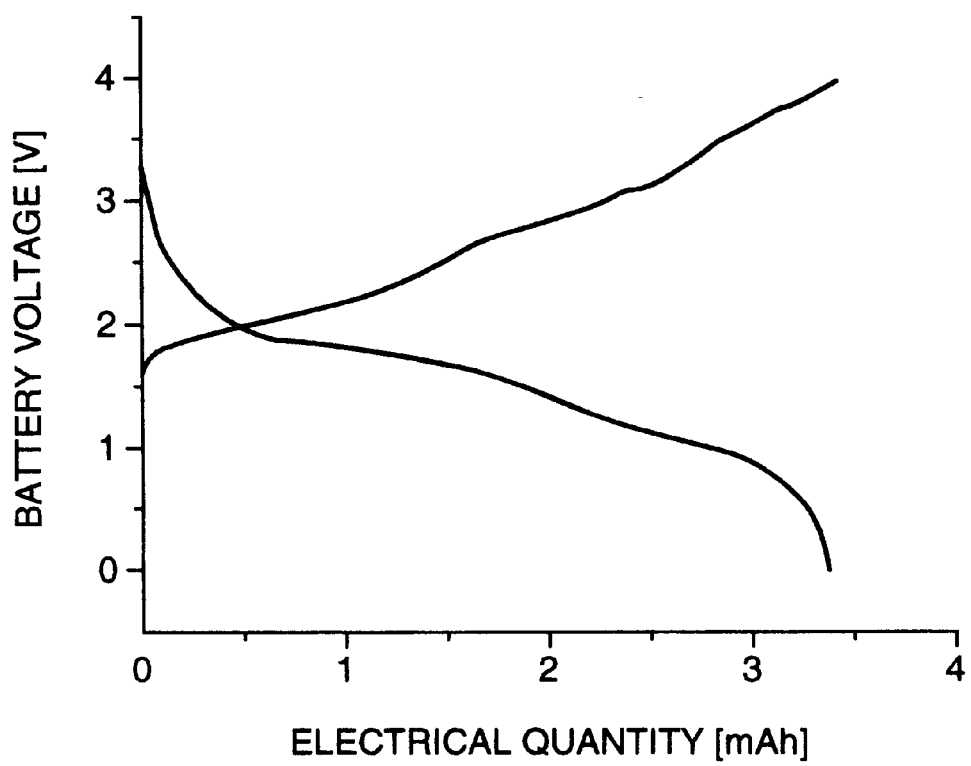
FIG. 2 is a graph which shows charge and discharge curve of the lithium secondary battery in one example of the present invention.
Figure 3:
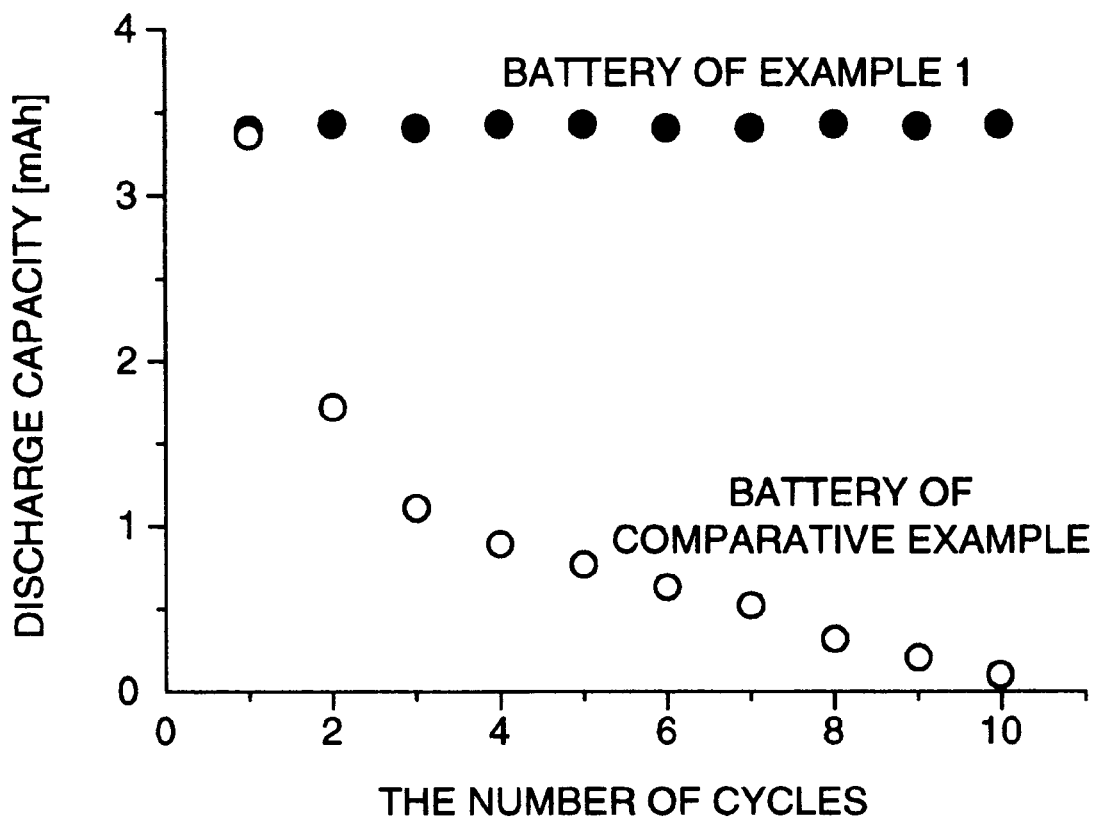
FIG. 3 is a graph which shows charge and discharge characteristics of the lithium secondary battery in one example of the present invention and the lithium secondary battery in a comparative example.

This battery was subjected to charging and discharging at a constant current of 150 $\mu$A and in the voltage range of 0–3.95 V. The charge and discharge curve at the second cycle is shown in FIG. 2. Change in discharge capacity with repetition of charge and discharge cycles is shown by ● in FIG. 3.

It can be seen from these results that the battery of this example had a discharging plateau at around 2.0 V and 1.0 V, and was satisfactory in cycle characteristics.

Next, as a comparative example, a lithium secondary battery was made using a non-aqueous solvent electrolyte as an electrolyte.

The same $LiCoO_2$ and $FeS_2$ as in Example 1 were used as the active material for positive electrode and the active material for negative electrode, respectively. To each of these active materials were added 5 wt % of graphite fibers as a conductive agent and 5 wt % of a fluorocarbon resin as a binder, followed by kneading them. This mixture was weighed so that weight of the active material in the mixture was the same as that in the above example, and packed in a mesh of 9.4 mm$\phi$ made of a high chromium stainless steel to make a positive electrode and a negative electrode.

The non-aqueous solvent electrolyte was prepared by dissolving 1 M of lithium phosphorus fluoride ($LiPF_6$) in a solvent prepared by mixing ethylene carbonate (EC) and ethyl methyl carbonate (EMC) at a volume ratio of 1:1.

Figure 4:
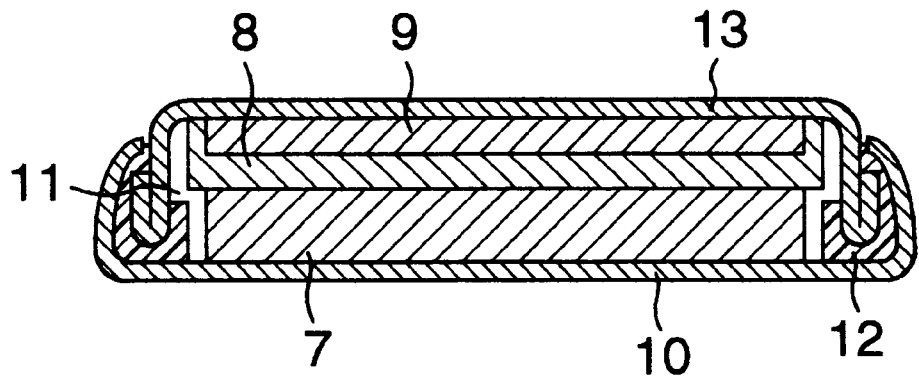
FIG. 4 is a sectional view of the lithium secondary battery in a comparative example.

A lithium battery having a sectional view as shown in FIG. 4 was made using the above positive electrode pellet and non-aqueous solvent electrolyte and, furthermore, a metallic lithium foil of 0.24 mm thick as a negative electrode, and a polypropylene porous film of 50 $\mu$m thick as a separator. In FIG. 4, 7 indicates the positive electrode pellet, 8 indicates the separator, 9 indicates the negative electrode, and 10 indicates a battery case made of stainless steel, and after filling with the non-aqueous solvent electrolyte 11, the case was sealed with a lid 13 by means of a gasket 12.

This battery was subjected to the same charge and discharge test as above. Change in discharge capacity with repetition of charge and discharge cycles is shown by ○ in FIG. 3. It can be seen as to this battery that the discharge capacity conspicuously changed with repetition of charge and discharge.

From the above results, it can be seen that according to the present invention there is obtained a lithium secondary battery in which a transition metal chalcogenide is used as an active material for negative electrode and which is excellent in charge and discharge cycle characteristics can be obtained by using a lithium ion conductive inorganic solid electrolyte.

Example 2

In this example, a lithium secondary battery was made in the same manner as in Example 1, except that a lithium• transition metal chalcogenide represented by $Li_2FeS_2$ was used in place of the transition metal chalcogenide represented by $FeS_2$ as the active material for negative electrode, and the characteristics of the resulting battery were evaluated.

The lithium• transition metal chalcogenide represented by $Li_2FeS_2$ was prepared by mixing FeS and $Li_2S$ at a molar ratio of 1:1, charging the mixture in a crucible of glassy carbon, and heating the mixture at 950° C. in an argon stream.

The resulting $Li_2FeS_2$ and the solid electrolyte were mixed at a weight ratio of 1:1 to obtain a material for negative electrode. A lithium secondary battery was made in the same manner as in Example 1, except that 20 mg of the resulting material for negative electrode was used as a negative electrode.

Figure 5:
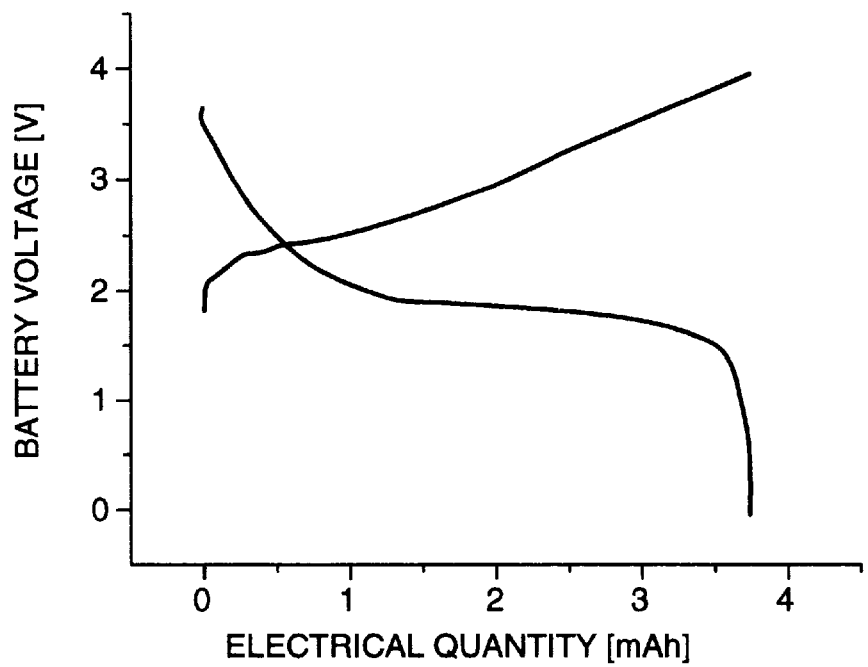
FIG. 5 is a graph which shows charge and discharge curve of the lithium secondary battery in one example of the present invention.
Figure 6:
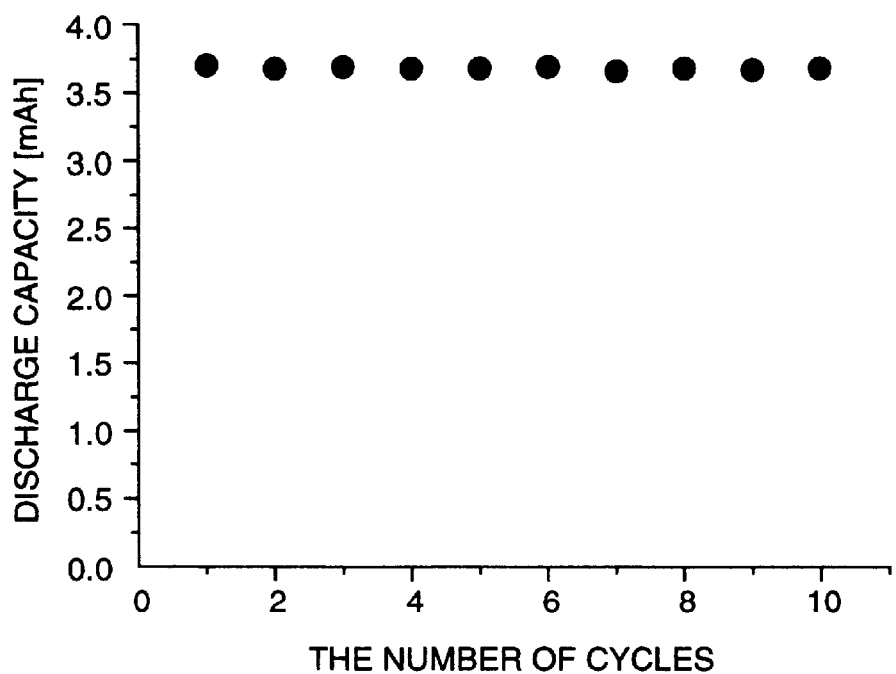
FIG. 6 is a graph which shows charge and discharge characteristics of the lithium secondary battery in one example of the present invention.

The resulting lithium secondary battery was subjected to the charge and discharge test under the same conditions as in Example 1. The charge and discharge curve at the second cycle is shown in FIG. 5. Change in discharge capacity with repetition of the charge and discharge cycle is shown in FIG. 6.

The discharge voltage of the lithium battery obtained in this example was about 2.0 V, and the plateaus at 1.0 V seen in Example 1 was not observed. It is considered that this result was due to the fact that the negative electrode showed always lower potential during the operation of the battery because the lithium-containing transition metal chalcogenide was used as the active material for negative electrode. The capacity density of $Li_2FeS_2$ corresponding to the operating voltage of higher than 1.5 V and calculated from the discharge voltage showed a high value of 370 mAh/g. It can be seen that the battery was higher in energy density than the battery obtained in Example 1.

Furthermore, substantially no decrease of discharge capacity was seen with repetition of charging and discharging. Thus, the lithium secondary battery was excellent in charge and discharge cycle characteristics.

From the above, it can be seen that according to the present invention, lithium secondary batteries excellent in charge and discharge cycle characteristics can be obtained using transition metal chalcogenides as an active material for negative electrode, and, furthermore, lithium secondary batteries higher in energy density can be obtained using lithium- transition metal chalcogenides.

Example 3

In this example, a lithium secondary battery was made in the same manner as in Example 1, except that a transition metal chalcogenide represented by $TiS_2$ was used in place of the transition metal chalcogenide represented by $FeS_2$ as the active material for negative electrode, and the characteristics of the resulting battery were evaluated.

The transition metal chalcogenide represented by $TiS_2$ used was a commercially available reagent. This $TiS_2$ and the solid electrolyte were mixed at a weight ratio of 1:1 to obtain a material for negative electrode. A lithium secondary battery was made in the same manner as in Example 1, except that 20 mg of the resulting material for negative electrode was used as a negative electrode.

Figure 7:
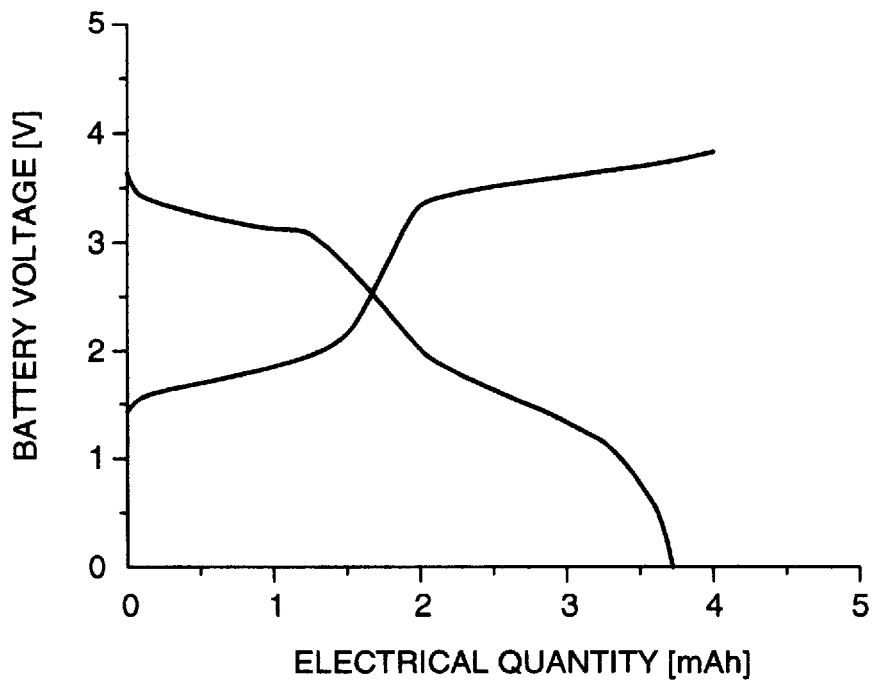
FIG. 7 is a graph which shows charge and discharge curve of the lithium secondary battery in one example of the present invention.
Figure 8:
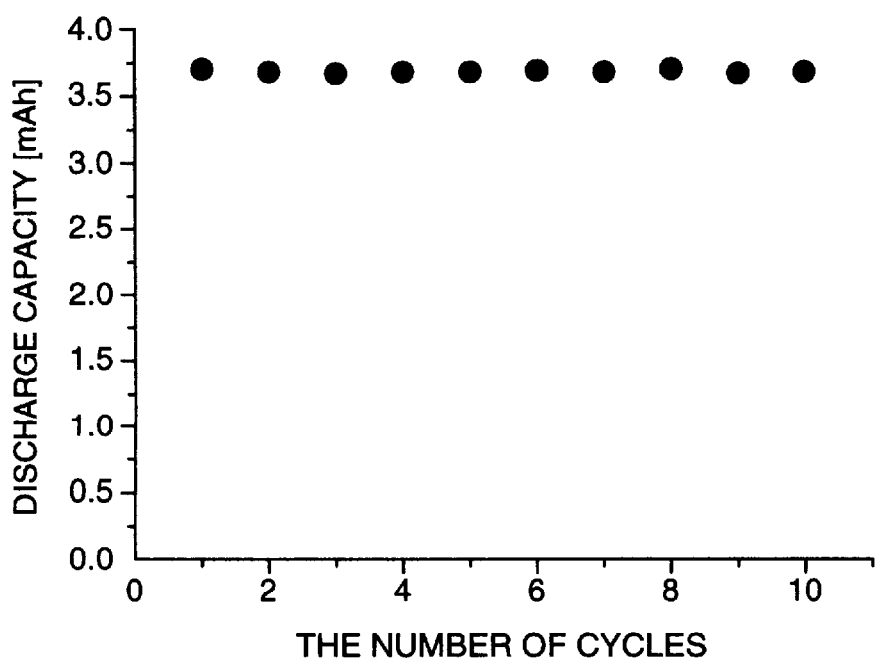
FIG. 8 is a graph which shows charge and discharge characteristics of the lithium secondary battery in one example of the present invention.

This battery was subjected to charging and discharging test at a constant current of 150 $\mu$A and in the voltage range of 0–3.95 V. The charge and discharge curve at the second cycle is shown in FIG. 7. Change in discharge capacity with repetition of the charge and discharge cycle is shown in FIG. 8.

It can be seen from these results that the battery of this example had a discharge plateau at around 3.5 V and 1.5 V, and was satisfactory in cycle characteristics.

It can be seen from the above results that according to the present invention, lithium secondary batteries excellent in charge and discharge cycle characteristics can be obtained using transition metal chalcogenides as an active material for negative electrode.

Example 4

In this example, a lithium secondary battery was made in the same manner as in Example 1, except that a lithium• transition metal chalcogenide represented by $LiTiS_2$ was used in place of the transition metal chalcogenide represented by $TiS_2$ used as the active material for negative electrode in Example 3, and characteristics of the resulting battery were evaluated.

The transition metal chalcogenide represented by $LiTiS_2$ was prepared in the following manner. First, $TiS_2$ which was a commercially available reagent was added to a solution of n-butyl lithium (n-BuLi) in hexane at a molar ratio of $TiS_2$:n-BuLi=1:1, and the mixture was left to stand for 3 days at room temperature. Then, this mixture was filtered to obtain a lithium• transition metal chalcogenide represented by $LiTiS_2$.

This $LiTiS_2$ and the solid electrolyte were mixed at a weight ratio of 1:1 to obtain a material for negative electrode. A lithium secondary battery was made in the same manner as in Example 1, except that 40 mg of this material for negative electrode was used as a negative electrode.

This battery was subjected to charging and discharging at a constant current of 150 $\mu$A and in the voltage range of 0–3.95 V. Only a discharge plateau of 3.5 V was observed, and that of 1.5 V seen in Example 3 was not observed. It is considered that this result was due to the fact that the negative electrode showed always lower potential during the operation of the battery because the lithium-containing transition metal chalcogenide was used as the active material for negative electrode. The capacity density of $LiTiS_2$ corresponding to the operating voltage of higher than 2.0 V and calculated from the discharge voltage showed a high value of 200 mAh/g. It can be seen that the battery was higher in energy density than the battery obtained in Example 3.

Moreover, there was substantially no decrease of discharge capacity with repetition of charging and discharging, and the battery was a lithium secondary battery excellent in charge and discharge cycle characteristics.

From the above, it can be seen that according to the present invention, lithium secondary batteries excellent in charge and discharge cycle characteristics can be obtained using transition metal chalcogenides as an active material for negative electrode, and, furthermore, lithium secondary batteries higher in energy density can be obtained using lithium• transition metal chalcogenides.

Example 5

In this example, a lithium secondary battery was made in the same manner as in Example 1, except that a transition metal chalcogenide represented by $CoS_2$ was used in place of the transition metal chalcogenide represented by $FeS_2$ as the active material for negative electrode, and the characteristics of the resulting battery were evaluated.

The transition metal chalcogenide represented by $CoS_2$ used was a commercially available reagent. A lithium secondary battery was made in the same manner as in Example 1, except that this $CoS_2$ was used in place of $FeS_2$, and the characteristics of the battery was evaluated to obtain nearly the same characteristics as in Example 1.

From the above, it can be seen that according to the present invention, lithium secondary batteries excellent in charge and discharge cycle characteristics can be obtained using transition metal chalcogenides as an active material for negative electrode.

Example 6

In this example, a lithium secondary battery was made in the same manner as in Example 2, except that a lithium• transition metal chalcogenide represented by $Li_2CoS_2$ was used in place of the lithium• transition metal chalcogenide represented by $Li_2FeS_2$ as the active material for negative electrode, and the characteristics of the resulting battery were evaluated.

The lithium• transition metal chalcogenide represented by $Li_2CoS_2$ was prepared by mixing CoS and $Li_2S$ at a molar ratio of 1:1, charging the mixture in a crucible of glassy carbon, and heating the mixture at 650° C. in an argon stream.

A lithium secondary battery was made in the same manner as in Example 2, except that $Li_2CoS_2$ obtained above was used, and the characteristics of the battery were evaluated to obtain nearly the same characteristics as in Example 2.

From the above, it can be seen that according to the present invention, lithium secondary batteries excellent in charge and discharge cycle characteristics can be obtained using transition metal chalcogenides as an active material for negative electrode.

Example 7

In this example, a lithium secondary battery was made in the same manner as in Example 1, except that a transition metal chalcogenide represented by $NiS_2$ was used in place of the transition metal chalcogenide represented by $FeS_2$ as the active material for negative electrode, and the characteristics of the resulting battery were evaluated.

The transition metal chalcogenide represented by $NiS_2$ used was a commercially available reagent. A lithium secondary battery was made in the same manner as in Example 1, except that this $NiS_2$ was used in place of $FeS_2$, and the characteristics of the battery were evaluated to obtain nearly the same characteristics as in Example 1.

From the above, it can be seen that according to the present invention, lithium secondary batteries excellent in charge and discharge cycle characteristics can be obtained using transition metal chalcogenides as an active material for negative electrode.

Example 8

In this example, a lithium secondary battery was made in the same manner as in Example 2, except that a lithium• transition metal chalcogenide represented by $Li_2NiS_2$ was used in place of the lithium• transition metal chalcogenide represented by $Li_2FeS_2$ as the active material for negative electrode, and the characteristics of the resulting battery were evaluated.

The lithium• transition metal chalcogenide represented by $Li_2NiS_2$ was prepared by mixing NiS and $Li_2S$ at a molar ratio of 1:1, charging the mixture in a glassy carbon crucible, and heating the mixture at 650° C. in an argon stream.

A lithium secondary battery was made in the same manner as in Example 2, except that $Li_2NiS_2$ obtained above was used, and the characteristics of the battery were evaluated to obtain nearly the same characteristics as in Example 2.

From the above, it can be seen that according to the present invention, lithium secondary batteries excellent in charge and discharge cycle characteristics can be obtained using transition metal chalcogenides as an active material for negative electrode.

Example 9

In this example, a lithium secondary battery was made in the same manner as in Example 1, except that a sulfide-based lithium ion conductive solid electrolyte represented by $0.05Li_4SiO_4$-$0.60Li_2S$-$0.35SiS_2$ was used in place of the amorphous solid electrolyte represented by $0.01Li_3PO_4$-$0.63Li_2S$-$0.36SiS_2$ as the electrolyte, and the characteristics thereof were evaluated.

The sulfide-based lithium ion conductive solid electrolyte represented by $0.05Li_4SiO_4$-$0.60Li_2S$-$0.35SiS_2$ was prepared in the same manner as in Example 1, except that a mixture of lithium orthosilicate ($Li_4SiO_4$), lithium sulfide and silicon sulfide at a molar ratio of 5:60:35 was used as the mixture of starting materials.

A lithium secondary battery was made in the same manner as in Example 1, except that the thus obtained electrolyte was used, and the characteristics of the battery were evaluated to obtain nearly the same characteristics as in Example 1.

From the above, it can be seen that according to the present invention, lithium secondary batteries excellent in charge and discharge cycle characteristics can be obtained using transition metal chalcogenides as an active material for negative electrode.

Example 10

In this example, a lithium secondary battery was made in the same manner as in Example 2, except that a sulfide-based lithium ion conductive solid electrolyte represented by $0.05Li_2O$-$0.60Li_2S$-$0.35SiS_2$ was used in place of the amorphous solid electrolyte represented by $0.01Li_3PO_4$-$0.63Li_2S$-$0.36SiS_2$ used in Example 1 as the electrolyte, and the characteristics of the battery were evaluated.

The sulfide-based lithium ion conductive solid electrolyte represented by $0.05Li_2O$-$0.60LI_2S$-$0.35SiS_2$ was prepared in the same manner as in Example 1, except that a mixture of lithium oxide ($Li_2O$), lithium sulfide and silicon sulfide at a molar ratio of 5:60:35 was used as the mixture of starting materials.

A lithium secondary battery was made in the same manner as in Example 2, except that the thus obtained electrolyte was used, and the characteristics of the battery were evaluated to obtain nearly the same characteristics as in Example 2.

From the above, it can be seen that according to the present invention, lithium secondary batteries excellent in charge and discharge cycle characteristics can be obtained using transition metal chalcogenides as an active material for negative electrode.

Example 11

In this example, a lithium secondary battery was made in the same manner as in Example 1, except that a sulfide-based lithium ion conductive solid electrolyte represented by $0.6Li_2S$-$0.4SiS_2$ was used in place of the amorphous solid electrolyte represented by $0.01Li_3PO_4$-$0.63Li_2S$-$0.36SiS_2$ as the electrolyte, and the characteristics of the battery were evaluated.

The sulfide-based lithium ion conductive solid electrolyte represented by $0.6Li_2S$-$0.4SiS_2$ was prepared in the same manner as in Example 1, except that a mixture of lithium sulfide and silicon sulfide at a molar ratio of 6:4 was used as the mixture of starting materials.

A lithium secondary battery was made in the same manner as in Example 1, except that the thus obtained electrolyte was used, and the characteristics of the battery were evaluated to obtain nearly the same characteristics as in Example 1.

From the above, it can be seen that according to the present invention, lithium secondary batteries excellent in charge and discharge cycle characteristics can be obtained using transition metal chalcogenides as an active material for negative electrode.

Example 12

In this example, a lithium battery was made in the same manner as in Example 1, except that a lithium ion conductive amorphous solid electrolyte represented by $0.6Li_2S$-$0.4P_2S_5$ which was one of the sulfide-based lithium ion conductive solid electrolytes was used in place of the amorphous solid electrolyte represented by $0.01Li_3PO_4$-$0.63Li_2S$-$0.36SiS_2$ as the electrolyte, and the characteristics of the battery were evaluated.

First, lithium sulfide ($Li_2S$) and phosphorus sulfide ($P_2S_5$) as starting materials were mixed at a molar ratio of 3:2. This mixture was enclosed in a quartz tube and molten at 900° C., and this quartz tube was introduced into water to rapidly cool the mixture, thereby obtaining an amorphous solid electrolyte represented by $0.6Li_2S$-$0.4P_2S_5$.

A lithium secondary battery was made in the same manner as in Example 1, except that the thus obtained electrolyte was used, and the characteristics of the battery were evaluated to obtain nearly the same characteristics as in Example 1.

From the above, it can be seen that according to the present invention, lithium secondary batteries excellent in charge and discharge cycle characteristics can be obtained using transition metal chalcogenides as an active material for negative electrode.

Example 13

In this example, a lithium battery was made in the same manner as in Example 1, except that a lithium ion conductive amorphous solid electrolyte represented by $0.5Li_2S$-$0.5B_2S_3$ which was one of the sulfide-based lithium ion conductive solid electrolytes was used in place of the amorphous solid electrolyte represented by $0.01Li_3PO_4$-$0.63Li_2S$-$0.36SiS_2$ as the electrolyte, and the characteristics of the battery were evaluated.

First, the amorphous solid electrolyte represented by $0.5Li_2S$-$0.5B_2S_3$ was obtained in the same manner as in Example 1, except that a mixture of lithium sulfide ($Li_2S$) and boron sulfide ($B_2S_3$) at a molar ratio of 1:1 was used as starting material.

A lithium secondary battery was made in the same manner as in Example 2, except that the thus obtained electrolyte was used, and the characteristics of the battery were evaluated to obtain nearly the same characteristics as in Example 2.

From the above, it can be seen that according to the present invention, lithium secondary batteries excellent in charge and discharge cycle characteristics can be obtained using transition metal chalcogenides as an active material for negative electrode.

Example 14

In this example, a lithium battery was made in the same manner as in Example 1, except that a sulfide-based lithium ion conductive solid electrolyte represented by $0.30LiI$-$0.35Li_2S$-$0.35SiS_3$ was used in place of the amorphous solid electrolyte represented by $0.01Li_3PO_4$-$0.63Li_2S$-$0.36SiS_2$ as the electrolyte, and the characteristics of the battery were evaluated.

The sulfide-based lithium ion conductive solid electrolyte represented by $0.30LiI$-$0.35Li_2S$-$0.35SiS_3$ was prepared in the same manner as in Example 1, except that a mixture of lithium iodide (LiI), lithium sulfide and silicon sulfide at a molar ratio of 6:7:7 was used as the starting material.

A lithium secondary battery was made in the same manner as in Example 1, except that the thus obtained electrolyte was used, and the characteristics of the battery were evaluated to obtain nearly the same characteristics as in Example 1.

From the above, it can be seen that according to the present invention, lithium secondary batteries excellent in charge and discharge cycle characteristics can be obtained using transition metal chalcogenides as an active material for negative electrode.

Example 15

In this example, a lithium secondary battery was made in the same manner as in Example 1, except that lithium nickel oxide ($LiNiO_2$) was used as the active material for positive electrode, and the characteristics of the battery were evaluated.

First, $LiNiO_2$ was prepared by mixing nickel oxide (NiO) and lithium hydroxide and heating the mixture at 800° C. in the air.

A lithium secondary battery was made in the same manner as in Example 1, except that $LiNiO_2$ was used in place of $LiCoO_2$, and the characteristics of the battery were evaluated in the same manner as in Example 1, except that the range of charging and discharging voltage was 0–3.85 V.

As a result, the operating voltage of the battery obtained in this example was slightly lower than that of the lithium secondary battery obtained in Example 1, but showed nearly the same charge and discharge cycle characteristics as those in Example 1.

From the above, it can be seen that according to the present invention, lithium secondary batteries excellent in charge and discharge cycle characteristics can be obtained using transition metal chalcogenides as an active material for negative electrode.

Example 16

In this example, a lithium secondary battery was made in the same manner as in Example 2, except that lithium nickel oxide ($LiNiO_2$) obtained in Example 15 was used as the active material for positive electrode, and the characteristics of the battery were evaluated.

A lithium secondary battery was made in the same manner as in Example 2, except that $LiNiO_2$ obtained in Example 15 was used in place of $LiCoO_2$, and the characteristics of the battery were evaluated in the same manner, except that the range of charging and discharging voltage was 0–3.85 V.

As a result, the operating voltage of the battery obtained in this example was slightly lower than that of the lithium secondary battery obtained in Example 2, but showed nearly the same charge and discharge cycle characteristics as those in Example 2.

From the above, it can be seen that according to the present invention, lithium secondary batteries excellent in charge and discharge cycle characteristics can be obtained using transition metal chalcogenides as an active material for negative electrode.

Example 17

In this example, a lithium secondary battery was made in the same manner as in Example 3, except that lithium nickel oxide ($LiNiO_2$) obtained in Example 15 was used as the active material for positive electrode, and the characteristics of the battery were evaluated.

A lithium secondary battery was made in the same manner as in Example 3, except that $LiNiO_2$ obtained in Example 15 was used in place of $LinCO_2$, and the characteristics of the battery were evaluated in the same manner as in Example 3, except that the range of charging and discharging voltage was 0–3.85 V.

As a result, the operating voltage of the battery obtained in this example was slightly lower than that of the lithium secondary battery obtained in Example 3, but showed nearly the same charge and discharge cycle characteristics as those in Example 3.

From the above, it can be seen that according to the present invention, lithium secondary batteries excellent in charge and discharge cycle characteristics can be obtained using transition metal chalcogenides as an active material for negative electrode.

Example 18

In this example, a lithium secondary battery was made in the same manner as in Example 4, except that lithium nickel oxide ($LiNiO_2$) obtained in Example 15 was used as the active material for positive electrode, and the characteristics of the battery were evaluated.

A lithium secondary battery was made in the same manner as in Example 4, except that $LiNO_2$ obtained in Example 15 was used in place of $LiCoO_2$, and the characteristics of the battery were evaluated in the same manner as in Example 4, except that the range of charging and discharging voltage was 0–3.85 V.

As a result, the operating voltage of the battery obtained in this example was slightly lower than that of the lithium secondary battery obtained in Example 4, but showed nearly the same charge and discharge cycle characteristics as those in Example 4.

From the above, it can be seen that according to the present invention, lithium secondary batteries excellent in charge and discharge cycle characteristics can be obtained using transition metal chalcogenides as an active material for negative electrode.

Example 19

In this example, a lithium secondary battery was made in the same manner as in Example 1, except that lithium manganese oxide ($LiMn_2O_4$) was used as the active material for positive electrode, and the characteristics of the battery were evaluated.

$LiMn_2O_4$ was prepared by mixing lithium carbonate ($Li_2CO_3$) and manganese acetate ($Mn(CH_3COO)_2$) and heating the mixture at 750° C. in the air.

A lithium secondary battery was made in the same manner as in Example 1, except that $LiMn_2O_4$ obtained above was used in place of $LiCoO_2$, and the characteristics of the battery were evaluated in the same manner, except that the range of charging and discharging voltage was 0–3.95 V.

As a result, the operating voltage of the battery obtained in this example was slightly lower than that of the lithium secondary battery obtained in Example 1, but showed nearly the same charge and discharge cycle characteristics as those in Example 1.

From the above, it can be seen that according to the present invention, lithium secondary batteries excellent in charge and discharge cycle characteristics can be obtained using transition metal chalcogenides as an active material for negative electrode.

In the above examples of the present invention, explanation has been made only on sulfides as the transition metal chalcogenides or lithium• transition metal chalcogenides. However, the similar effects can be obtained using selenides such as $VSe_2$ and $TiSe_2$, tellurides, and the like, and the present invention is not limited to only the sulfides as the transition metal chalcogenides or lithium• transition metal chalcogenides.

Furthermore, as for the transition metal elements, the similar effects can be obtained using chalcogenides containing a plurality of transition metal elements, such as $Fe_{1-x}Co_xS_2$.

Moreover, as for active materials for positive electrode, the similar effects can be obtained using lithium• transition metal oxides such as $LiMnO_2$, $LiNio_{0.5}Mn_{1.5}O_4$, $LiCro_{0.8}Mn_{1.2}O_4$, $LiNiVO_4$, and $LiCOPO_4$, and transition metal sulfides which have not been explained in the examples.

Furthermore, in the examples of the present invention, only the $Li_2S$—$SiS_2$ type has been explained as the lithium ion conductive inorganic solid electrolytes, but the similar effects can be obtained using other sulfide-based solid electrolytes such as $Li_2S$—$Al_2S_3$, and oxide-based solid electrolytes such as $Li_2O$—$SiO_2$, $Li_2O$—$SiO_2$—$P_2O_5$, $Li_{0.5-3x}RE_{0.5+x}TiO_3$ (RE=La, Pr, Nd) which have not been explained in the examples.

As explained above, charge and discharge characteristics of lithium secondary batteries which use transition metal chalcogenides or lithium• transition metal chalcogenides as active materials for negative electrode can be improved by using lithium ion conductive inorganic solid electrolytes as electrolytes.

Having thus described the present invention, it is readily apparent that various modifications can be made by those who are skilled in the art without departing from the scope of the present invention. It is intended that the invention embraces these equivalents within the scope of the claims that follow.

What is claimed is:

1. A lithium secondary battery which comprises a positive electrode, a negative electrode containing an active material comprising mainly at least one transition metal chalcogenide, and an electrolyte comprising mainly a sulfide-based lithium ion conductive inorganic solid electrolyte comprising mainly a sulfide.

2. A lithium secondary battery which comprises a positive electrode, a negative electrode containing an active material comprising mainly at least one lithium transition metal chalcogenide, and an electrolyte comprising mainly a sulfide-based lithium ion conductive inorganic solid electrolyte comprising mainly a sulfide.

3. A lithium secondary battery according to claim 1, wherein the transition metal is at least one metal selected from the group consisting of iron, cobalt and nickel.

4. A lithium secondary battery according to claim 3, wherein when the lithium• transition metal chalcogenide is represented by $Li_xFeS_y$ (Li: lithium, Me: at least one metal selected from the group consisting of iron, cobalt and nickel, X: chalcogen, and x and y are numerals corresponding to the compositional ratio of the elements), the minimum formal charge (n) of the transition metal element during the operation of the lithium secondary battery satisfies $+2 \geq n \geq 0$, with a proviso that the formal charge of the chalcogen is −2 and the formal charge of lithium is +1.

5. A lithium secondary battery according to claim 1, wherein the transition metal is at least one metal selected from the group consisting of vanadium, titanium, chromium, molybdenum, niobium and manganese.

6. A lithium secondary battery according to claim 5, wherein when the lithium• transition metal chalcogenide is represented by $Li_xMeX_y$ (Li: lithium, Me: at least one metal selected from the group consisting of vanadium, titanium, chromium, molybdenum, niobium and manganese, X: chalcogen, and x and y are numerals corresponding to the compositional ratio of the elements), the minimum formal charge (n) of the transition metal element during the operation of the lithium secondary battery satisfies $+3 \geq n \geq 0$, with a proviso that the formal charge of the chalcogen is −2 and the formal charge of lithium is +1.

7. A lithium secondary battery according to claim 1, wherein the chalcogen element is sulfur.

8. A lithium secondary battery according to claim 1, wherein the sulfide-based lithium ion conductive solid electrolyte has a bridging oxygen.

9. A lithium secondary battery according to claim 1, wherein an active material for the positive electrode is a lithium-containing transition metal oxide.

10. A lithium secondary battery according to claim 2, wherein the transition metal is at least one metal selected from the group consisting of iron, cobalt and nickel.

11. A lithium secondary battery according to claim 10, wherein when the lithium transition metal chalcogenide is represented by $Li_xMeX_y$ (Li: lithium, Me: at least one metal selected from the group consisting of iron, cobalt and nickel, X: chalcogen, and x and y are numerals corresponding to the compositional ratio of the elements), the minimum formal charge (n) of the transition metal element during the operation of the lithium secondary battery satisfies $+2 \geqq n \geqq 0$, with a proviso that the formal charge of the chalcogen is $-2$ and the formal charge of lithium is $+1$.

12. A lithium secondary battery according to claim 2, wherein the transition metal is at least one metal selected from the group consisting of vanadium, titanium, chromium, molybdenum, niobium and manganese.

13. A lithium secondary battery according to claim 12, wherein the lithium transition metal chalcogenide is represented by $Li_xMeX_y$ (Li: lithium, Me: at least one metal selected from the group consisting of vanadium, titanium, chromium, molybdenum, niobium and manganese, X: chalcogen, and x and y are numerals corresponding to the compositional ratio of the elements), the minimum formal charge (n) of the transition metal element during the operation of the lithium secondary battery satisfies $+3 > n > 0$, with a proviso that the formal charge of the chalcogen is $-2$ and the formal charge of lithium is $+1$.

14. A lithium secondary battery according to claim 2, wherein the chalcogen element is sulfur.

15. A lithium secondary battery according to claim 2, wherein the sulfide-based lithium ion conductive solid electrolyte has a bridging oxygen.

16. A lithium secondary battery according to claim 2, wherein an active material for the positive electrode is a lithium-containing transition metal oxide.

* * * * *